US007072799B2

(12) United States Patent
Kojima

(10) Patent No.: US 7,072,799 B2
(45) Date of Patent: Jul. 4, 2006

(54) INFORMATION PROCESSING APPARATUS, MAINTENANCE MANAGING METHOD, PROGRAM, AND COMPUTER-READABLE STORING MEDIUM

(75) Inventor: Nobuyuki Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/837,679

(22) Filed: May 4, 2004

(65) Prior Publication Data

US 2004/0228640 A1 Nov. 18, 2004

(30) Foreign Application Priority Data

May 12, 2003 (JP) ............................ 2003-132832

(51) Int. Cl.
*G06F 15/00* (2006.01)

(52) U.S. Cl. ........................... 702/184; 399/8; 399/12; 358/1.15

(58) Field of Classification Search ........ 702/182–185; 399/8, 9, 11, 12, 18, 19, 24, 31; 250/204
See application file for complete search history.

(56) References Cited

U.S. PATENT DOCUMENTS

| | | | | |
|---|---|---|---|---|
| 4,377,742 | A * | 3/1983 | Kawabata et al. | 250/204 |
| 4,870,459 | A | 9/1989 | Ito et al. | 355/209 |
| 5,984,454 | A * | 11/1999 | Takahashi et al. | 347/43 |
| 6,141,507 | A * | 10/2000 | Sawada | 399/8 |
| 6,493,467 | B1 * | 12/2002 | Okuda et al. | 382/260 |
| 6,612,675 | B1 * | 9/2003 | Takahashi | 347/16 |
| 6,643,474 | B1 * | 11/2003 | Kodama et al. | 399/21 |
| 6,776,544 | B1 * | 8/2004 | Jauert | 400/120.01 |
| 2002/0085847 | A1 * | 7/2002 | Yoshida et al | 399/12 |
| 2002/0191215 | A1 * | 12/2002 | Watanabe | 358/1.15 |
| 2002/0196476 | A1 * | 12/2002 | Ozaki | 358/406 |
| 2003/0063913 | A1 * | 4/2003 | Yamazaki | 399/8 |
| 2004/0039810 | A1 * | 2/2004 | Donescu et al. | 709/223 |
| 2004/0066535 | A1 * | 4/2004 | Oyumi | 358/1.15 |
| 2004/0101320 | A1 * | 5/2004 | Haramoto | 399/12 |
| 2005/0021245 | A1 * | 1/2005 | Furuno et al. | 702/33 |

FOREIGN PATENT DOCUMENTS

| | | |
|---|---|---|
| JP | 1-123253 | 5/1989 |
| JP | 7-66885 | 3/1995 |

* cited by examiner

*Primary Examiner*—Carol S. W. Tsai
(74) *Attorney, Agent, or Firm*—Fitzpatrick, Cella, Harper & Scinto

(57) ABSTRACT

In an information processing apparatus which can obtain use histories of the parts in an image forming apparatus, counter values of the parts in the image forming apparatus are obtained, magnitudes of the previously obtained counter value and the presently obtained counter value are discriminated, and if it is determined by the discrimination that the counter value becomes smaller, with respect to the part before exchanging, the previously obtained counter value is set into use results of the part before the exchanging.

21 Claims, 12 Drawing Sheets

FIG. 8

| |
|---|
| FIG. 8A |
| FIG. 8B |

FIG. 8A

DATA WHICH IS NOTIFIED TO THE CENTER SIDE MANAGEMENT SERVER FROM THE MONITORING APPARATUS

| | | |
|---|---|---|
| 801 | THE TOTAL NUMBER OF TRANSFER DATA BYTES | THE TOTAL NUMBER OF BYTES OF DATA SHOWN IN THIS TABLE |
| 802 | TRANSFER PAGE NO. | INDICATES INFORMATION OF PARTS COUNTER |
| 803 | COMMUNICATION TYPE | |
| 804 | THE NUMBER OF PARTS | THE NUMBER OF PARTS: NEXT INFORMATION IS SENT BY AN AMOUNT OF THIS VALUE |
| | | |
| 805 | PARTS ID | ID NO. TO SPECIFY PARTS |
| 806 | PARTS COUNTER (THE NUMBER OF TIMES) | COUNTER VALUE (THE NUMBER OF TIMES) SHOWING USE FREQUENCY OF PARTS |
| 807 | COUNTER UPON PREVIOUS EXCHANGING (THE NUMBER OF TIMES) | COUNTER VALUE (THE NUMBER OF TIMES) UPON PREVIOUS EXCHANGING |
| 808 | LIFE (THE NUMBER OF TIMES) | PRESET LIFE (THE NUMBER OF TIMES) |
| 809 | PARTS COUNTER (THE NUMBER OF SHEETS) | COUNTER VALUE (THE NUMBER OF SHEETS) SHOWING USE FREQUENCY OF PARTS |
| 810 | COUNTER UPON PREVIOUS EXCHANGING (THE NUMBER OF SHEETS) | COUNTER VALUE (THE NUMBER OF SHEETS) UPON PREVIOUS EXCHANGING |
| 811 | LIFE (THE NUMBER OF SHEETS) | PRESET LIFE (THE NUMBER OF SHEETS) |
| 812 | DATE/TIME OF PREVIOUS EXCHANGING | DATE/TIME OF EXCHANGE |
| 813 | ACCUMULATION COUNTER UPON EXCHANGING | THE ACCUMULATED NUMBER OF PRINT SHEETS UPON EXCHANGING |
| | | |

TO FIG. 8B

FIG. 8B

FROM FIG. 8A

| | | |
|---|---|---|
| | | |
| 814 | PARTS ID | ID NO. TO SPECIFY PARTS |
| 815 | PARTS COUNTER (THE NUMBER OF TIMES) | COUNTER VALUE (THE NUMBER OF TIMES) SHOWING USE FREQUENCY OF PARTS |
| 816 | COUNTER UPON PREVIOUS EXCHANGING (THE NUMBER OF TIMES) | COUNTER VALUE (THE NUMBER OF TIMES) UPON PREVIOUS EXCHANGING |
| 817 | LIFE (THE NUMBER OF TIMES) | PRESET LIFE (THE NUMBER OF TIMES) |
| 818 | PARTS COUNTER (TIME) | COUNTER VALUE (TIME) SHOWING USE FREQUENCY OF PARTS |
| 819 | COUNTER UPON PREVIOUS EXCHANGING (TIME) | COUNTER VALUE (TIME) UPON PREVIOUS EXCHANGING |
| 820 | LIFE (UNIT 2) | PRESET LIFE (TIME) |
| 821 | DATE/TIME OF PREVIOUS EXCHANGING | DATE/TIME OF EXCHANGE |
| 822 | ACCUMULATION COUNTER UPON EXCHANGING | THE ACCUMULATED NUMBER OF PRINT SHEETS UPON EXCHANGING |
| | | |
| 823 | PARTS ID | ID NO. TO SPECIFY PARTS |
| 824 | PARTS COUNTER (THE NUMBER OF SHEETS) | COUNTER VALUE (THE NUMBER OF SHEETS) SHOWING USE FREQUENCY OF PARTS |
| 825 | COUNTER UPON PREVIOUS EXCHANGING (THE NUMBER OF SHEETS) | COUNTER VALUE (THE NUMBER OF SHEETS) UPON PREVIOUS EXCHANGING |
| 826 | LIFE (THE NUMBER OF SHEETS) | PRESET LIFE (THE NUMBER OF SHEETS) |
| 827 | PARTS COUNTER (TIME) | COUNTER VALUE (TIME) SHOWING USE FREQUENCY OF PARTS |
| 828 | COUNTER UPON PREVIOUS EXCHANGING (TIME) | COUNTER VALUE (TIME) UPON PREVIOUS EXCHANGING |
| 829 | LIFE (TIME) | PRESET LIFE (TIME) |
| 830 | DATE/TIME OF PREVIOUS EXCHANGING | DATE/TIME OF EXCHANGE |
| 831 | ACCUMULATION COUNTER UPON EXCHANGING | THE ACCUMULATED NUMBER OF PRINT SHEETS UPON EXCHANGING |

FIG. 9

(A) PARTS COUNTER INFORMATION OBTAINED FROM THE DEVICE HAVING PARTS EXCHANGE HISTORY

| | | |
|---|---|---|
| 901 | PARTS ID | 12345678 |
| 902 | PARTS COUNTER (THE NUMBER OF TIMES) | 12000 |
| 903 | PARTS COUNTER (THE NUMBER OF SHEETS) | 5691 |
| 904 | COUNTER UPON PREVIOUS EXCHANGING (THE NUMBER OF TIMES) | 15483 |
| 905 | COUNTER UPON PREVIOUS EXCHANGING (THE NUMBER OF SHEETS) | 7742 |

(B) PRESENT COUNTER DATA

| | | |
|---|---|---|
| 906 | PARTS ID | 12345678 |
| 907 | PARTS COUNTER (THE NUMBER OF TIMES) | 12425 |
| 908 | PARTS COUNTER (THE NUMBER OF SHEETS) | 6231 |
| 909 | COUNTER UPON PREVIOUS EXCHANGING (THE NUMBER OF TIMES) | 15483 |
| 910 | COUNTER UPON PREVIOUS EXCHANGING (THE NUMBER OF SHEETS) | 7742 |

(C) FIRST COUNTER DATA OBTAINED AFTER THE EXCHANGE OF PARTS

| | | |
|---|---|---|
| 911 | PARTS ID | 12345678 |
| 912 | PARTS COUNTER (THE NUMBER OF TIMES) | 105 |
| 913 | PARTS COUNTER (THE NUMBER OF SHEETS) | 23 |
| 914 | COUNTER UPON PREVIOUS EXCHANGING (THE NUMBER OF TIMES) | 12485 |
| 915 | COUNTER UPON PREVIOUS EXCHANGING (THE NUMBER OF SHEETS) | 7745 |

FIG. 10

(A) PARTS COUNTER INFORMATION OBTAINED FROM THE DEVICE HAVING NO PARTS EXCHANGE HISTORY

| | | |
|---|---|---|
| 1001 | PARTS ID | 12345678 |
| 1002 | PARTS COUNTER (THE NUMBER OF TIMES) | 12000 |
| 1003 | PARTS COUNTER (THE NUMBER OF SHEETS) | 5691 |
| 1004 | COUNTER UPON PREVIOUS EXCHANGING (THE NUMBER OF TIMES) | 0 |
| 1005 | COUNTER UPON PREVIOUS EXCHANGING (THE NUMBER OF SHEETS) | 0 |

(B) PRESENT COUNTER DATA

| | | |
|---|---|---|
| 1006 | PARTS ID | 12345678 |
| 1007 | PARTS COUNTER (THE NUMBER OF TIMES) | 12425 |
| 1008 | PARTS COUNTER (THE NUMBER OF SHEETS) | 6231 |
| 1009 | COUNTER UPON PREVIOUS EXCHANGING (THE NUMBER OF TIMES) | 0 |
| 1010 | COUNTER UPON PREVIOUS EXCHANGING (THE NUMBER OF SHEETS) | 0 |

(C) FIRST COUNTER DATA OBTAINED AFTER THE EXCHANGE OF PARTS

| | | |
|---|---|---|
| 1011 | PARTS ID | 12345678 |
| 1012 | PARTS COUNTER (THE NUMBER OF TIMES) | 105 |
| 1013 | PARTS COUNTER (THE NUMBER OF SHEETS) | 23 |
| 1014 | COUNTER UPON PREVIOUS EXCHANGING (THE NUMBER OF TIMES) | 0 |
| 1015 | COUNTER UPON PREVIOUS EXCHANGING (THE NUMBER OF SHEETS) | 0 |

S705

(D) VALUES WHICH ARE MANAGED BY THE MANAGING APPARATUS

| | | |
|---|---|---|
| 1016 | PARTS ID | 12345678 |
| 1017 | PARTS COUNTER (THE NUMBER OF TIMES) | 12000 |
| 1018 | PARTS COUNTER (THE NUMBER OF SHEETS) | 5691 |
| 1019 | COUNTER UPON PREVIOUS EXCHANGING (THE NUMBER OF TIMES) | 11481 |
| 1020 | COUNTER UPON PREVIOUS EXCHANGING (THE NUMBER OF SHEETS) | 6874 |

S704

(E) VALUES WHICH ARE MANAGED BY THE MANAGING APPARATUS

| | | |
|---|---|---|
| 1021 | PARTS ID | 12345678 |
| 1022 | PARTS COUNTER (THE NUMBER OF TIMES) | 105 |
| 1023 | PARTS COUNTER (THE NUMBER OF SHEETS) | 23 |
| 1024 | COUNTER UPON PREVIOUS EXCHANGING (THE NUMBER OF TIMES) | 12000 |
| 1025 | COUNTER UPON PREVIOUS EXCHANGING (THE NUMBER OF SHEETS) | 5691 |

FIG. 11

| PARTS NAME | PARTS ID |
|---|---|
| ORIGINAL ILLUMINATING LAMP | 12345678 |
| INTERMEDIATE CLEANER UNIT | AAAAAAAA |
| INTERMEDIATE TRANSFER BELT UNIT | BBBBBBBB |
| OUTER SECONDARY TRANSFER ROLLER | CCCCCCCC |
| CASSETTE 1 FEED ROLLER (B/C ROLLER) | DDDDDDDD |
| CASSETTE 2 FEED ROLLER (B/C ROLLER) | EEEEEEEE |
| MANUAL INSERTION TRAY FEED ROLLER (B/C ROLLER) | FFFFFFFF |
| UPPER FIXING ROLLER | GGGGGGGG |
| LOWER FIXING ROLLER | HHHHHHHH |
| FIXING UNIT | IIIIIIII |
| UPPER FIXING FRAME UNIT | JJJJJJJJ |
| ADF FEED ROLLER | KKKKKKKK |
| ADF SEPARATING PAD | LLLLLLLL |
| ADF CONVEYING BELT | MMMMMMMM |
| ADF SEPARATING ROLLER | NNNNNNNN |
| SIDE PAPER DECK FEED ROLLER (B/C ROLLER) | OOOOOOOO |
| CASSETTE 3 FEED ROLLER (B/C ROLLER) | PPPPPPPP |
| CASSETTE 4 FEED ROLLER (B/C ROLLER) | QQQQQQQQ |
| THE NUMBER OF SHEETS PASSING THROUGH FINISHER STRAIGHT PATH | RRRRRRRR |
| THE NUMBER OF OPERATING TIMES OF STAPLER IN STACKER PORTION | SSSSSSSS |
| THE NUMBER OF OPERATING TIMES OF PADDLE | TTTTTTTT |
| THE NUMBER OF SHEETS PASSING THROUGH SADDLE PATH | UUUUUUUU |
| THE NUMBER OF OPERATING TIMES OF STAPLER IN SADDLE PORTION | VVVVVVVV |

1101

INFORMATION PROCESSING APPARATUS, MAINTENANCE MANAGING METHOD, PROGRAM, AND COMPUTER-READABLE STORING MEDIUM

BACKGROUND OF THE INVENTION

1. Field of the Invention

The invention relates to a mechanism for managing a use history of each part of an image forming apparatus from the outside of the image forming apparatus.

2. Related Background Art

Each consumable part which is used in an office machine has a prescribed life. On the basis of a discrimination result about whether or not a counter value for measuring a consumption degree in the life shows a presumed life reference value, a serviceman exchanges the part.

The counter value of a part of an image forming apparatus is also obtained in a remote place. Whether or not the counter value shows that the part has reached the end of the life is discriminated, and the serviceman does the work to exchange the part which has approached the end of the life.

In Japanese Patent Application Laid-open No. H7-066885, there is disclosed a print system in which a life of a detachable unit is discriminated on the basis of the reference value and data such as a use situation or the like of the unit which is notified periodically or at predetermined timing in a remote place through a network and, when it is determined that the part has reached the end of the life, the image forming apparatus is notified of such a fact.

As a technique which has conventionally been known, in Japanese Patent Application Laid-open No. H1-123253, in a copying apparatus having exchange parts, there has been known an image forming apparatus in which, on the basis of the life of the part which was exchanged the previous time, a life reference corrected in accordance with use results can be predicted.

As mentioned above, with respect to each of the parts used in the image forming apparatus, a conventional technique of managing the lives in the remote place as shown in Japanese Patent Application Laid-open No. H7-066885 has been known. A conventional technique of managing the use results of the parts according to the usage of the parts which can be different for every user and using the use results as a life reference as disclosed in Japanese Patent Application No. H1-123253 has also been known.

However, there is such a problem that when the use histories of the parts which are actually being used are managed by an external apparatus in a remote place, if the part is exchanged and, for example, the counter (for example, a counter to count the number of print sheets) of the use situation of the part is reset in some way such as that the serviceman depresses a counter reset button, or the like, the counter value in the image forming apparatus increases or decreases and the life histories of the parts cannot be accurately managed.

To solve such a problem, a solving measure of providing a mechanism which notifies the external apparatus in the remote place of the counter values (use histories) of the use situations of the parts before exchanging has also been presumed. However, there is such a problem that when it is considered that the image forming apparatus used on the user destination side is included in the apparatuses as targets to be maintenance-managed, since there are a number of apparatuses which do not have the function of notifying the external apparatus in the remote place of the counter values of the use situations of the parts before the exchanging, such a solving measure does not provide an overall solution.

SUMMARY OF THE INVENTION

Accordingly, the present invention is conceived as a response to the above-described disadvantages of the conventional arts.

According to one aspect of the present invention, preferably, in an information processing apparatus which can obtain use histories of parts in an image forming apparatus, there is provided a mechanism in which counter values of the parts in the image forming apparatus are obtained, magnitudes of the obtained counter values are discriminated, and when it is determined by the discrimination that the counter value is smaller, with respect to the part before exchanging as a target, the counter value obtained the last is set to the use result of the part before the exchanging.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8, which is composed of FIGS. 8A and 8B, shows data formats of parts counters which are notified to a center side management server by the monitoring apparatus 1;

FIG. 9 is a diagram showing statuses of information which is obtained from the devices;

FIG. 10 is a diagram showing the statuses of the information which is obtained from the device; and FIG. 11 is a list of parts having parts counter information and their IDs.

DETAILED DESCRIPTION OF THE PREFERRED EMBODIMENTS

A preferred embodiment of the present invention will now be described in detail with reference to the drawings. It should be noted that the relative arrangement of the components, the numerical expression, and numerical values set forth in these embodiments do not limit the scope of the present invention unless it is specifically stated otherwise.

The embodiments of the invention will now be described hereinbelow with reference to the drawings.

First Embodiment

Figure 1:
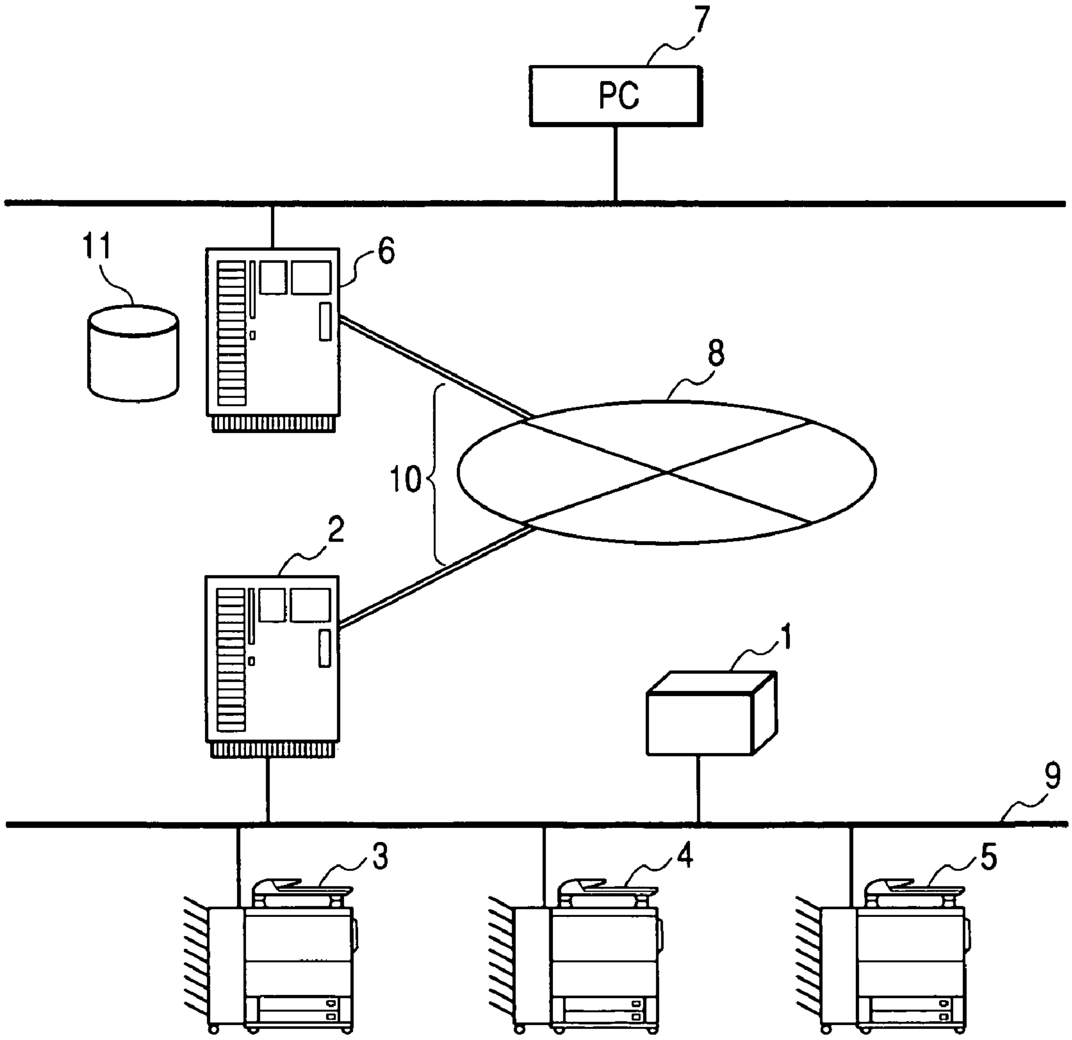
FIG. 1 is a conceptual diagram showing an example of a whole construction of a device remote monitoring system to which an information processing apparatus according to an embodiment of the invention is connected.

FIG. 1 is a diagram showing a whole construction of the first embodiment of a remote monitoring system including a managing apparatus according to the invention.

In the remote monitoring system, each of a management server 6 on the center side and a management server 2 on the base point side is constructed by a general information processing apparatus, and the servers 6 and 2 can communicate with each other through a communication line 8 such as Internet or the like by a predetermined protocol 10. The base point side management server 2 and the center side management server 6 can be presumed as portions for executing functions of, for example, a mail server and a router.

Although the center side management server 6 and the base point side management server 2 are connected through the communication line 8 by the predetermined protocol 10, a general protocol (SMTP) and authentication are also provided in order to prevent illegal access and exceeding a firewall.

A monitoring apparatus 1 is connected to image forming apparatuses 3 to 5 and a personal computer (hereinafter, abbreviated as "PC") 12 (not shown) through a network 9 and has functions for collecting operation information and fault information (which will be explained in detail hereinafter) of the image forming apparatuses 3 to 5 and the PC 12 and updating a control program or the like of the image forming apparatuses 3 to 5 and the PC 12. Further, the monitoring apparatus 1 has a function for transferring the collected information to the center side management server 6 through the base point side management server 2.

A personal computer (hereinafter, abbreviated as "PC") 7 is connected to the center side management server 6 through the network and operates as a client computer of the center side management server 6. The PC 7 executes various information processes and can share the information collected by the center side management server 6.

In FIG. 1, the monitoring apparatus 1 and the base point side management server 2 are separately set and the PC 7 and the center side management server 6 are separately set. However, the monitoring apparatus 1 and the base point side management server 2 can be constructed as one apparatus, and the PC 7 and the center side management server 6 can also be constructed as one apparatus.

Although only one monitoring apparatus 1 is shown in FIG. 1, actually, a plurality of monitoring apparatuses are connected to the network 9. The image forming apparatuses and the PCs which are respectively monitored by the monitoring apparatuses are connected to the network 9. The center side management server 6 unitarily manages the plurality of monitoring apparatuses. Each of the plurality of monitoring apparatuses realizes various processes/control, which will be explained hereinafter.

Specifically speaking, each of the image forming apparatuses 3 to 5 in FIG. 1 is any of a printer (including an electrophotographic system and an ink jet system), a facsimile apparatus, a digital hybrid apparatus in which functions of a scanner, a printer, and a facsimile are integratedly provided, a print server, and the like.

The PC 12 (not shown in FIG. 1) has functions for converting, for example, predetermined application data into PDL (Page Description Language) data through an OS (Operating System) and a printer driver and transmitting the PDL data to any of the image forming apparatuses 3 to 5.

The monitoring apparatus 1 collects maintenance information from the image forming apparatuses 3 to 5 and the PC 12. In the maintenance information, at least the fault information is included in the operation information. In the image forming apparatuses 3 to 5, the operation information is their statuses, residual amounts of toner, the number of print sheets per sheet size, and the like. In the PC 12, the operation information is operating situations of a CPU and a memory in the PC 12, a use situation of a toll application, and the like. The fault information is jam information in the image forming apparatuses 3 to 5, information indicative of the number of reactivating times in the PC 12, and the like.

Figure 2:
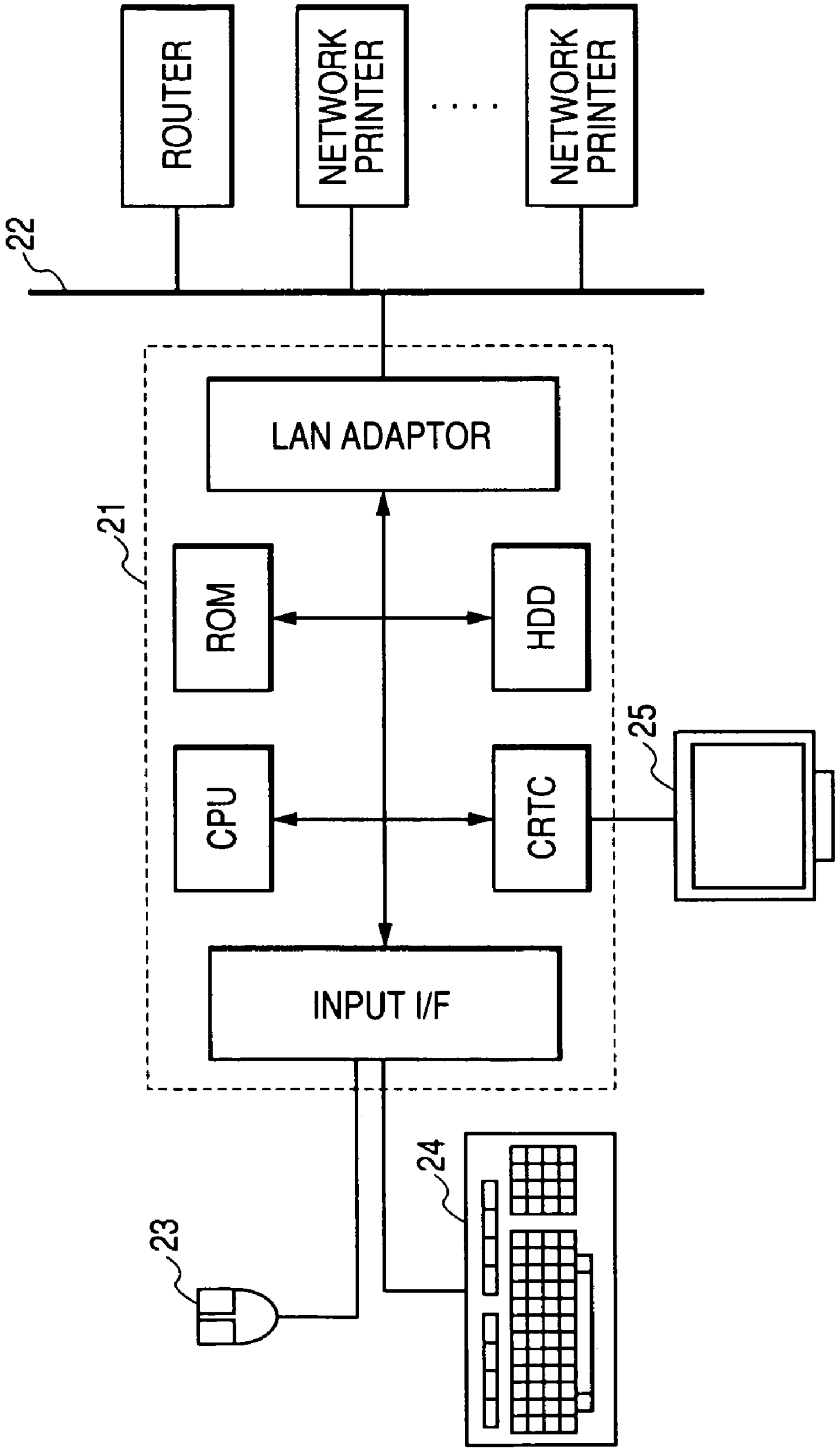
FIG. 2 is a block diagram showing a construction of hardware of a monitoring apparatus 1 in FIG. 1.

FIG. 2 is a block diagram showing a construction of hardware of the monitoring apparatus 1, PC 12, PC 7, the base point side management server 2, and the center side management server 6 shown in FIG. 1.

The monitoring apparatus 1, etc., comprises a general personal computer 21 constructed by: an input interface for a mouse 23 and a keyboard 24; a CPU; a ROM; a RAM; an HDD; a CRTC (video card) connected to a monitor 25; and a LAN adapter connected to a network 22 on a base point side. Counter information showing use situations of various parts obtained from a plurality of devices is held in the RAM and HDD.

Figure 3:
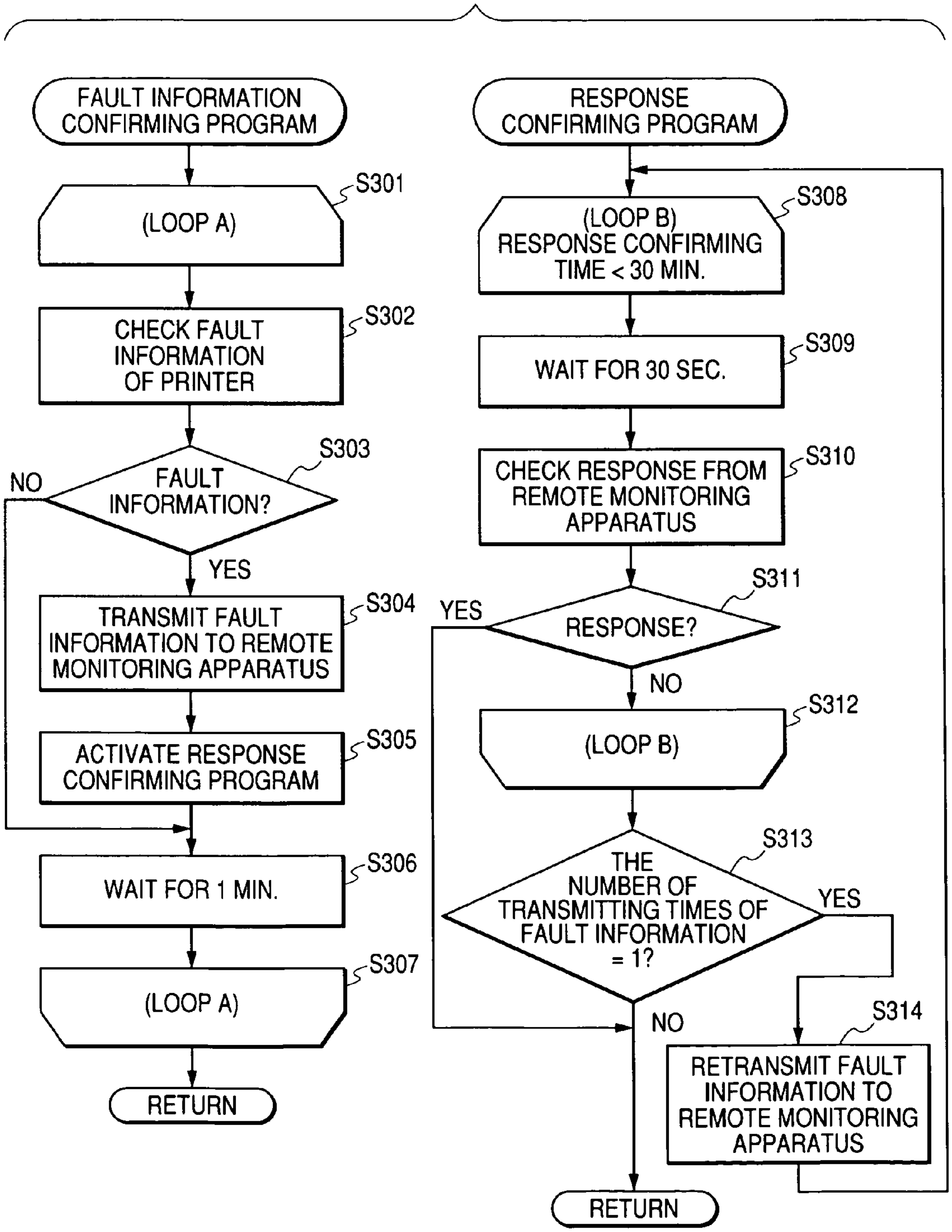
FIG. 3 is a flowchart showing processes of the monitoring apparatus 1.

FIG. 3 is a flowchart showing a device fault monitoring process by the monitoring apparatus 1. Explanation will now be made with respect to a case where information transmission from the monitoring apparatus 1 to the base point side management server 2, the center side management server 6 (hereinafter, referred to as a host), or the center side client PC 7 is performed by the SMTP and information reception is performed by a POP (Post Office Protocol).

In step S302 in FIG. 3, the monitoring apparatus 1 executes a fault information confirming program to confirm the fault information of devices as monitoring targets and executes processes in steps S303 to S307 with respect to each of the monitoring target devices, thereby executing a confirming process of the fault information, for example, at intervals of one minute. First, in step S302, the monitoring apparatus 1 obtains the fault information with respect to monitoring target devices through the LAN 9. In next step S303, whether the fault information has been obtained or not is discriminated. If it is determined that the fault information has been obtained, step S304 follows.

In step S304, the monitoring apparatus 1 transmits the fault information obtained in step S302 to the host. In step S305, the monitoring apparatus 1 activates a response confirming program for waiting for a response from the host. If it is determined in step S303 that the fault information is not obtained in step S302, the processing routine advances to step S306. In step S306, the monitoring apparatus 1 waits for one minute in order to confirm the fault information at intervals of one minute.

After the monitoring apparatus 1 transmits the fault information to the host in step S304, in step S308, the monitoring apparatus 1 executes the response confirming program which is executed in step S305. When the host receives the fault information from the monitoring apparatus 1, the host notifies the monitoring apparatus 1 of information showing the reception of the fault information by E-mail (hereinafter, abbreviated to mail). In the response confirming program, the monitoring apparatus 1 waits for the response from the host for a maximum of 30 minutes while repeating processes in steps S309 to S311 at intervals of, for example, 30 seconds. If there is no response during such a period of time, the monitoring apparatus 1 executes a process to retransmit the fault information to the host only once.

In step S309, the monitoring apparatus 1 waits for 30 seconds in order to execute the process at intervals of 30 seconds. In next step S310, the monitoring apparatus 1 receives the mail from the host and discriminates whether the received mail is response mail to a fault process or not. If it is determined in step S311 that the received mail is response mail to the fault process, the process of the response confirming program is finished. If it is determined in step S311 that the received mail is not the response mail to the fault process, when an elapsed time from the activation of the response confirming program is within 30 minutes, the processing routine is returned to step S309. If the elapsed time from the activation of the response confirming program exceeds 30 minutes, step S313 follows.

In step S313, the monitoring apparatus 1 discriminates the number of transmitting times of the fault information to the host. If the fault information has already been retransmitted to the host, since the retransmission is executed only once, the response confirming program is finished. If the fault information is never retransmitted to the host in step S313, the monitoring apparatus 1 retransmits the fault information to the host in step S314.

Figure 4:
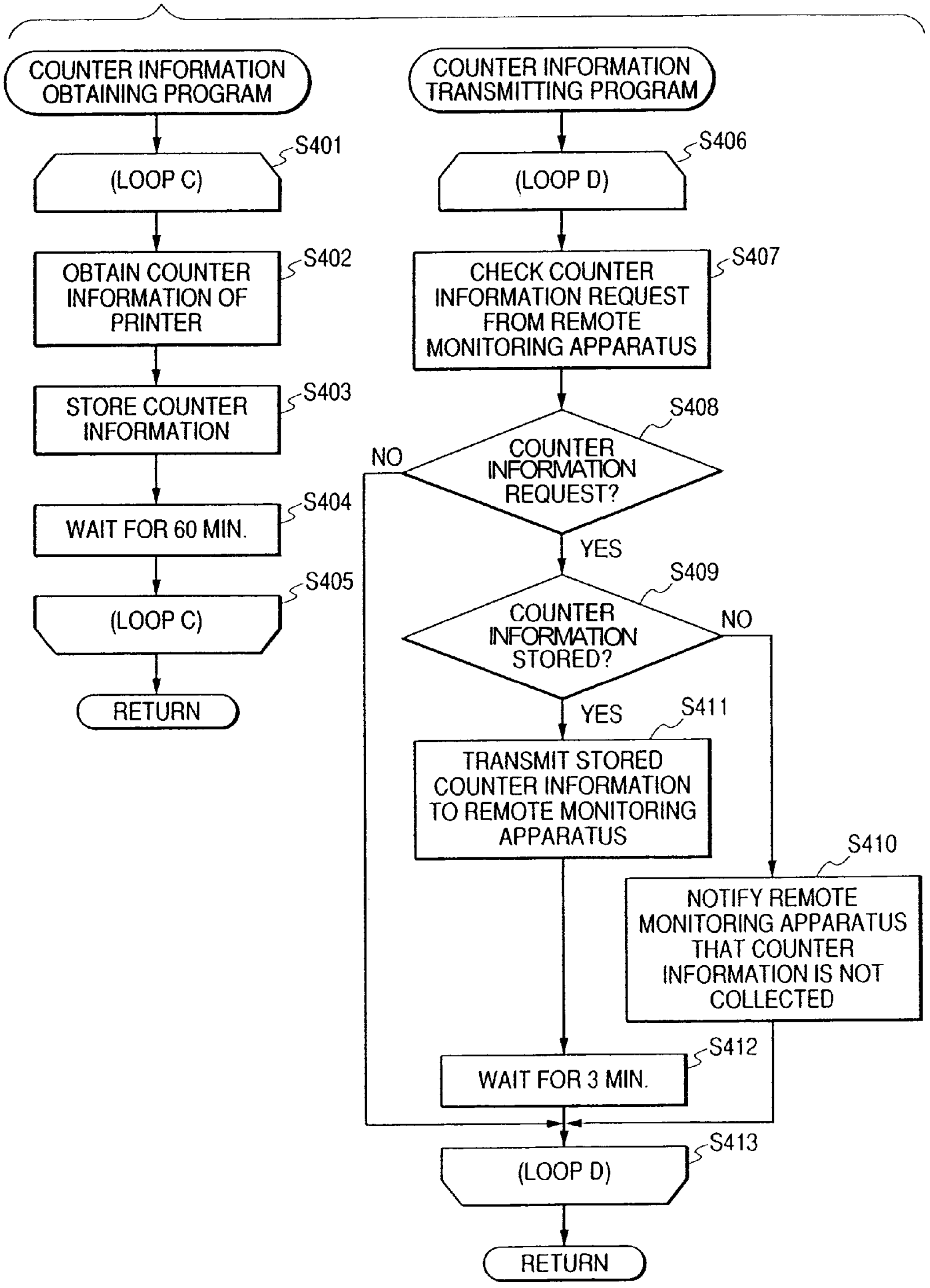
FIG. 4 is a flowchart showing the processes of the monitoring apparatus 1.

FIG. 4 is a flowchart showing the counter information obtaining process by which the monitoring apparatus 1 collects the counter information of the devices 3 to 5 and the PC 12. The counter information in the embodiment denotes information including a part or all of the maintenance information of the devices 3 to 5 and the personal computer 12. The counter information obtaining process shown in the flowchart is executed to each of the devices.

In FIG. 4, first, the monitoring apparatus 1 executes a counter information obtaining program for obtaining the counter information and executes processes in steps S402 to S404 at intervals of, for example, 60 minutes with respect to each of the monitoring target devices, thereby preparing for an obtaining request of the counter information from the host. First, in step S402, the monitoring apparatus 1 obtains the counter information from the devices. Subsequently, in step S403, the monitoring apparatus 1 stores the counter information obtained from the devices in step S402 into a flash ROM or the hard disk (HDD) in FIG. 2 in order to prepare for the counter information obtaining request from the host. When a data format of the counter information which is obtained from the devices and that of the counter information which is transmitted to the host are different, the data can be also converted at a point of time when the counter information is stored. There is also a method whereby the data conversion is executed when the counter information obtaining request is issued by the host. In step S404, the monitoring apparatus 1 waits for 60 minutes in order to execute a similar obtaining process of the counter information 60 minutes later.

By executing the counter information obtaining program, the monitoring apparatus 1 activates a counter information transmitting program in order to transmit the counter information in response to the request for the counter information from the host. The host transmits mail including a counter information request command to the monitoring apparatus 1, thereby requesting the counter information. The counter information transmitting program checks the mail from the host at intervals of, for example, 3 minutes, thereby preparing for the request for the counter information. First, in step S407, the monitoring apparatus 1 discriminates the presence or absence of the request for the counter information from the host. If it is determined in step S408 that there is no request for the counter information, step S413 follows. If it is determined in step S408 that the request for the counter information has been issued, step S409 follows.

In step S409, the monitoring apparatus 1 discriminates whether the counter information has been stored or not by the counter information obtaining program. If the counter information has been stored, the monitoring apparatus 1 transmits the stored counter information to the host in step S411. By executing such a process, the counter information transmitted to the host from the monitoring apparatus 1 is shared in the center side client PC 7 as described above and can be referred to by, for example, the operator. When the counter information is not stored, the monitoring apparatus 1 notifies the host that the counter information is not collected yet in step S410. In step S412, the monitoring apparatus 1 waits for 3 minutes in order to discriminate the presence or absence of the request for the counter information from the host at intervals of, for example, 3 minutes.

Since the device fault information monitoring process described in FIG. 3 and the counter information obtaining process described in FIG. 4 are executed as mentioned above, the maintenance information in the image forming apparatuses and the personal computers which are used on the user destination side can be unitarily and concentratedly managed in a remote place.

<Block Diagram of the Image Forming Apparatus>

Figure 5:
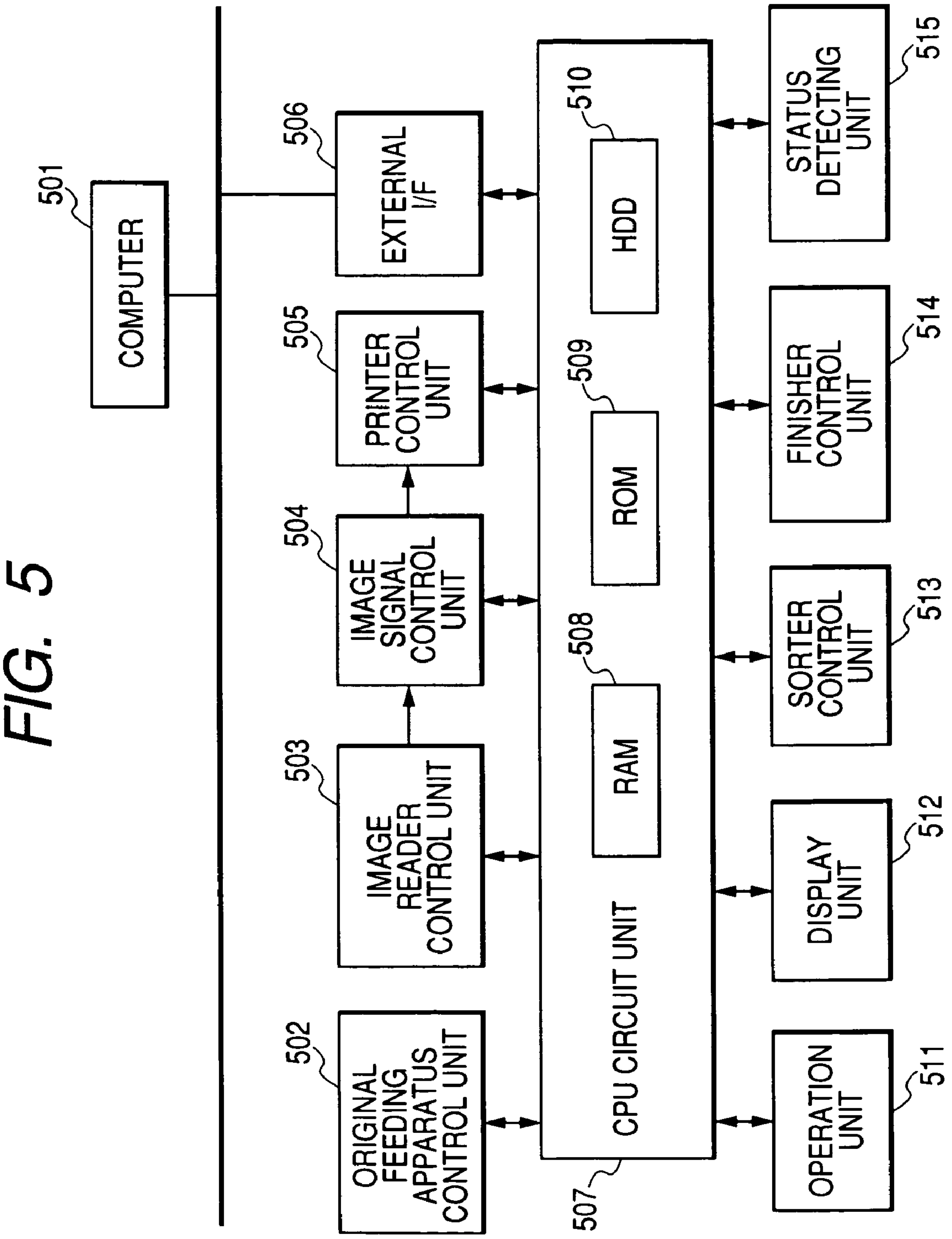
FIG. 5 is a block diagram showing an example of a construction of a controller for controlling the whole image forming apparatus as an example of devices 3 to 5 in FIG. 1.

FIG. 5 is a block diagram showing a construction of a controller for controlling the whole image forming apparatus.

As shown in FIG. 5, the controller has a CPU circuit unit 507. A CPU (not shown), a RAM 508, a ROM 509, and a hard disk (HDD) 510 are connected to the CPU circuit unit 507. The CPU circuit unit 507 integratedly controls blocks 502, 503, 504, 505, 506, 511, 512, 513, 514, and 515 by a control program stored in the ROM 509, respectively. The RAM 508 temporarily holds control data and is used as a work area for an arithmetic operating process which is necessary for the control. The HDD 510 stores the information necessary for the control and information received from the blocks 502 to 506 and 511 to 515, respectively.

An original feeding apparatus control unit 502 controls the driving of an original feeding apparatus (that is, a document feeder) (not shown) on the basis of an instruction from the CPU circuit unit 507. An image reader control unit 503 controls the driving of a scanner unit, an image sensor, and the like (which are not shown) and transfers an analog image signal outputted from the image sensor to an image signal control unit 504.

After the image signal control unit 504 converts the analog image signal into a digital signal, it executes a signal process, converts the digital signal into a video signal, and outputs it to a printer control unit 505. Printing is executed on the basis of the outputted video signal. An external interface (I/F) 506 executes various processes to a digital image signal inputted from a computer 501 through a LAN interface, converts the digital image signal into a video signal, and outputs it to the printer control unit 505. The external I/F 506 communicates with a device managing apparatus (not shown) through the LAN interface. The processing operation by the image signal control unit 504 is controlled by the CPU circuit unit 507. The printer control unit 505 drives an exposure control unit (not shown) on the basis of the inputted video signal.

An operation unit 511 has a plurality of keys for setting various functions regarding the image creation, the display unit for displaying information showing setting modes, and the like. The operation unit 511 outputs a key signal corresponding to the operation of each key to the CPU circuit unit 507 and displays corresponding information to a display unit 512 on the basis of a signal from the CPU circuit unit 507.

A sorter control unit 513 and a finisher control unit 514 are made operative on the basis of the signal from the CPU circuit unit 507 by an input from the user through the external I/F 506 or the setting by the operation unit 511. A status detecting unit collects status information from each portion, makes a discrimination about an abnormality detection or the like, and notifies the CPU circuit unit 507 of discrimination results. The CPU circuit unit 507 displays the abnormality to the computer 501 or the like through the display unit 512 and the external I/F 506 in response to the notification.

Figure 6:
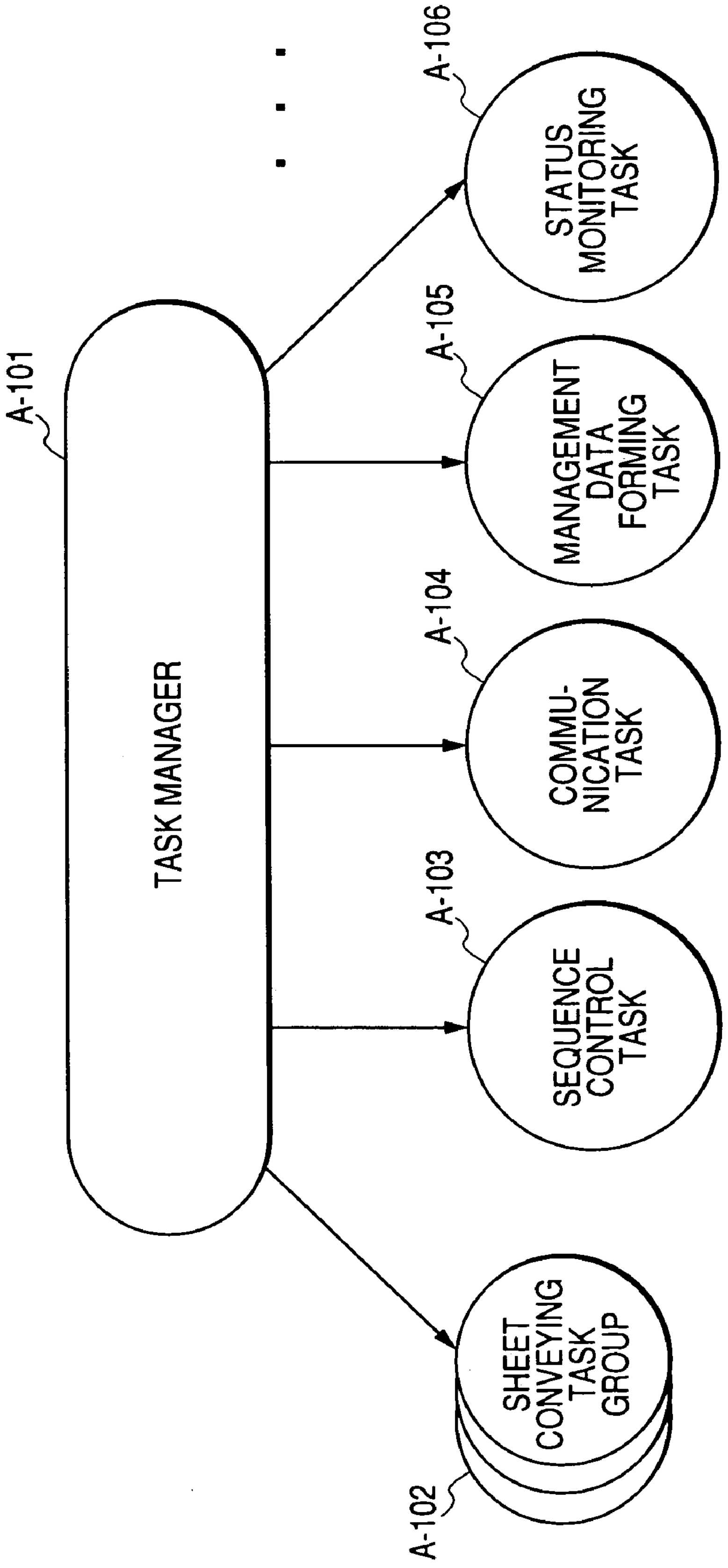
FIG. 6 is a block diagram showing a construction of software of the image forming apparatus.

FIG. 6 is a diagram showing a construction of software of the image forming apparatus.

A task manager A-101 simultaneously manages a plurality of tasks. A sheet conveying task group A-102 is provided to convey an original and a sheet on which an image is formed. A sequence control task A-103 is used for managing the whole image forming apparatus. A communication task A-104 is used for communicating with the device managing apparatus. A management data forming task A-105 is provided to form data for remote management in the embodiment.

In the image forming apparatus, each time an image is formed, the counting operation is executed every sheet size, every mode, every sheet type, and every color. The counting operation is executed by the management data forming task A-105 and count results are stored in a memory device in the image forming apparatus.

Similarly, status information showing a paper jam, an error, an alarm, or the like is stored into a memory device in the image forming apparatus in a predetermined data format.

Further, each section in the image forming apparatus has a counter showing an exchange life and a use frequency degree of each component consumable part (hereinbelow, such a counter is referred to as a parts counter). Results counted in the management data forming task A-105 are stored in a memory device in the image forming apparatus.

A status monitoring task A-106 of the image forming apparatus is used for detecting abnormality (paper jam, error, alarm) in the image forming apparatus and detecting a change in preset status of the device. Detection results are stored in a memory device in the image forming apparatus through the management data forming task A-105. As a detecting mechanism in the embodiment, either a mechanism using software using a timer, a flag, or the like or a mechanism for obtaining output values from various sensors can be used.

The information stored in the memory devices is notified to the base point side management server 2 at predetermined timing in response to a request for the information from a base point temporary server.

The above explanation relates to a fundamental construction of the invention, and complementary functions of the parts counters in the invention will be described in detail with reference to FIGS. 7 to 11.

FIGS. 8A and 8B are data formats of a plurality of parts counter information which are notified to the center side management server 6 by the monitoring apparatus 1. It corresponds to a holding format into the storing unit in the monitoring apparatus 1. It also corresponds to the counter information which is notified to the monitoring apparatus 1 from the image forming apparatus.

The parts counter information is notified in such a data format for every device to be managed. A series of data constructed by PARTS Counters 806 and 809 showing the use frequency degrees of the present parts, PARTS Counters 807 and 810 upon previous exchanging, presumed lives (lives which have been presumed by the manufacturer) 808 and 811, date/time 812 of the previous exchanging, and the total number of print sheets 813 upon exchanging with respect to each part (PARTS ID 805) held in the device to be managed is repetitively stored by the number of times corresponding to the number of parts. The lives of different units are defined in the presumed lives 808 and 811. The number of rotating times (in the diagram, "the number of times" is shown) is defined as a life reference value in the presumed life 808. The number of sheets is defined as a life reference value in the presumed life 811. Since the life reference values of the different units are recorded, a calculation to predict the life can be executed by using a correlation between the life reference values. For example, different life discriminations are made in the case where the value of the number of rotating times is large and the value of the number of sheets is small and in the case where both values of the number of rotating times and the number of sheets are large.

A flow for processes from the operation when the monitoring apparatus 1 obtains the parts counters of the device to be managed to the operation when the monitoring apparatus 1 notifies the center side management server of the data will be described with reference to FIG. 7. First, explanation will be made with respect to FIGS. 9 to 11.

(A) in FIG. 9 denotes parts counter information which is obtained from the device that supports a parts exchange history function. (B) in FIG. 9 denotes parts counter information at the time when the data in (A) in FIG. 9 is again obtained in the case where the parts are not exchanged after the data was obtained. (C) in FIG. 9 denotes parts counter information at the time when the data in (A) in FIG. 9 is again obtained in the case where the parts are exchanged after the data in (A) in FIG. 9 was obtained.

(A) in FIG. 10 denotes parts counter information which is obtained from the device that does not support a parts exchange history function. (B) in FIG. 10 denotes parts counter information at the time when the data in (A) in FIG. 10 is again obtained in the case where the parts are not exchanged after the data was obtained. (C) in FIG. 10 denotes parts counter information at the time when the data in (A) in FIG. 10 is again obtained in the case where the parts are exchanged after the data in (A) in FIG. 10 was obtained. (D) in FIG. 10 denotes counter information which is managed by the monitoring apparatus 1 after the parts data in (A) in FIG. 10 was obtained. (E) in FIG. 10 denotes counter information which is managed by the monitoring apparatus 1 after the parts data in (C) in FIG. 10 was obtained.

FIG. 11 shows an example of parts names to which PARTS IDs in FIGS. 8 to 10 are applied. The counter value of each unit (the number of times, the number of sheets, or the time) in each part as shown in FIG. 11 is obtained by the monitoring apparatus 1 and the server side managing apparatus 2. Reference numeral 1101 in FIG. 11 corresponds to PARTS ID in FIGS. 9 and 10.

Figure 7:
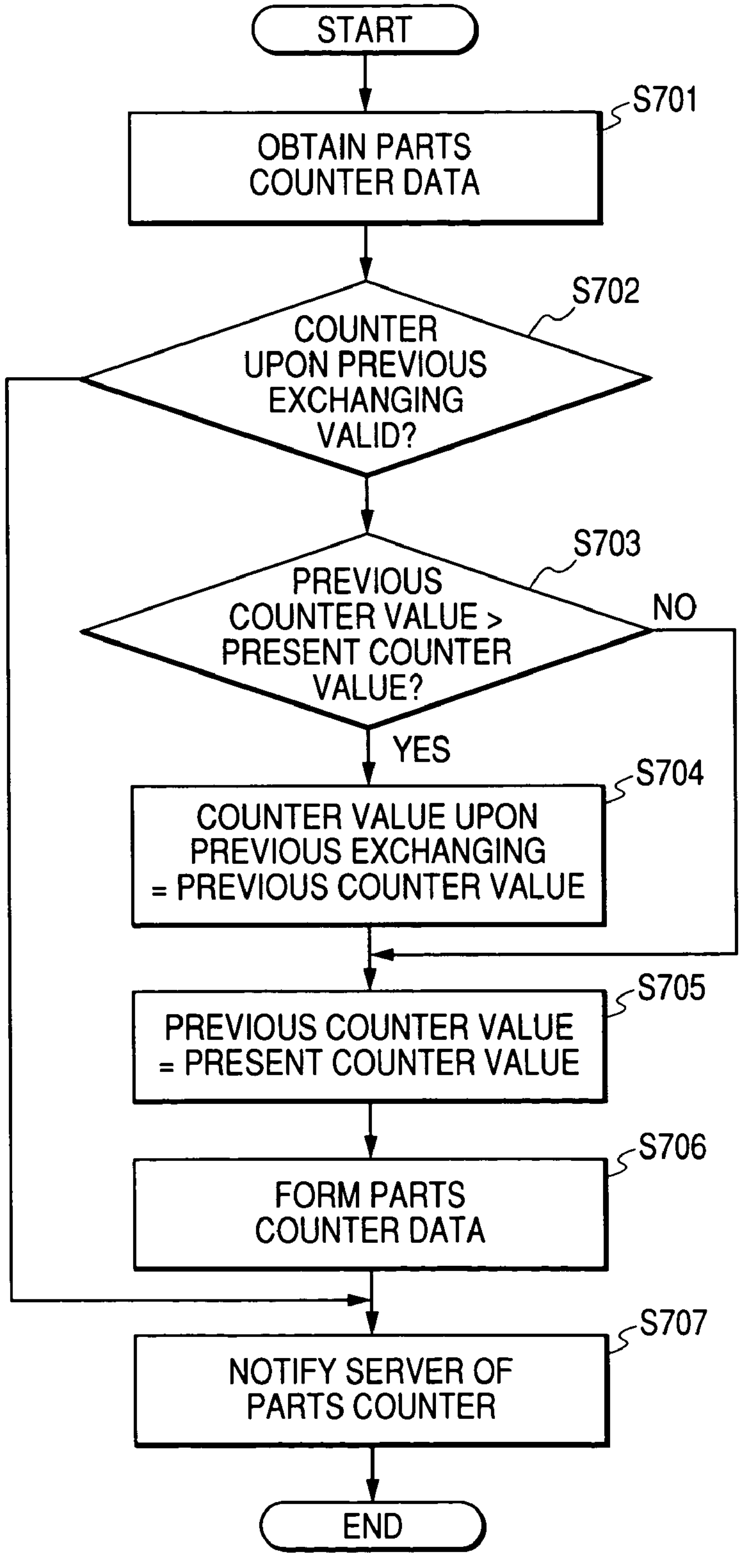
FIG. 7 is a flowchart showing processes by which the monitoring apparatus 1 manages data of a counter upon previous exchanging.

FIG. 7 will now be explained. FIG. 7 is a flowchart showing a sequence in which the monitoring apparatus 1 obtains the parts counter data from the devices, complements the counter values upon previous exchanging, and notifies the center side management server. This flowchart corresponds to the processes in which in the information processing apparatus which can obtain the use histories of the parts in the image forming apparatus, the counter values of the parts in the image forming apparatus are obtained, the magnitudes of the obtained counter values are discriminated, and when it is determined by the discrimination that the counter value becomes smaller, the counter value obtained the last is set to the use result of the part before the exchanging with respect to the part before the exchanging as a target. The operation for setting the counter value obtained in the external apparatus into the life result of the part to be exchanged with respect to the part before the exchanging as a target is substantially equivalent to the operation to obtain the use result finally used, although it is not strict. Naturally, it is presumed that the counting operation of the parts counter is executed at intervals of a sufficient short time such as 15 minutes.

The parts counter is obtained from the device in step S701. This obtaining operation is executed to each of a plurality of image forming apparatuses shown in FIG. 1 and in correspondence to each part in each image forming apparatus. The data format obtained in the monitoring apparatus 1 with respect to each part is as shown in FIGS. 8A and 8B described above.

FIGS. 9 and 10 show examples of the data which is obtained at this time. If the device to be managed has the parts exchange history function, the proper values have been stored in the counters upon previous exchanging as shown in (A) in FIG. 9. On the contrary, if the device to be managed does not have the parts exchange history function, a value “0” is stored into the counters upon previous exchanging as shown in (A) in FIG. 10 and returned.

Therefore, if the valid value is not stored in the counter upon previous exchanging in the obtained parts counter data (that is, “0” has been stored) in step S702, it is determined that the device does not have the function for storing the history information of the counter upon previous exchanging. The complementing process by the monitoring apparatus 1 of the invention is executed. This complementing process substantially corresponds to the process for deciding a rough value as a life upon exchanging of a predetermined part.

If the valid value exists in the counter upon previous exchanging, since the complementing process by the monitoring apparatus 1 is unnecessary, the center side management server is notified of the obtained parts counter data in step S707. The method of discriminating whether or not the image forming apparatus as a target for obtaining the counter data has the function for storing the history information of the counter upon previous exchanging in step S702 is not limited to the above mechanism. For example, the discriminating can also be performed by a method whereby a correspondence relational table between a device model name and the function is preliminarily held in the monitoring apparatus 1 and the device model name is obtained from the image forming apparatus.

The previous counter values and the counters upon previous exchanging as shown in (D) in FIG. 10 have been stored in the monitoring apparatus 1. The previous counter values are stored in S705. The holding process here corresponds to the process for storing the data of the use situation obtained from the counter obtaining device into the storing unit. It is assumed that this explanation is also true of other storing processes in FIG. 7.

In S703, the previous parts counter values stored in the monitoring apparatus 1 are compared with the parts counter values obtained from the device this time. Assuming that the previous counter values have been obtained as shown in (A) in FIG. 10, those counter values are stored in the monitoring apparatus 1 as shown in (D) in FIG. 10.

If the part is not exchanged, the counters indicative of its use amounts are as shown in (B) in FIG. 10. Each counter ought to be equal to or larger than the previous value.

On the contrary, if the present parts counter is smaller than the previous counter value as shown in (C) in FIG. 10, this means that the counter has been reset by the exchanging of the part. The resetting operation of the counter is executed by the serviceman who executes the parts exchanging operation.

If a reversal of the counter value (that is, the counter value changes from a large counter value to a small counter value) occurs, the previous parts counter is set into the counter upon previous exchanging in S704. That is, in the monitoring apparatus 1, the counter upon previous exchanging in (E) in FIG. 10 is updated.

In S705, the present obtained counter value is overwritten and stored as a previous counter value.

That is, assuming that the previous obtained counter value is as shown in (A) in FIG. 10 and the present obtained counter value is as shown in (C) in FIG. 10, the data stored in the monitoring apparatus 1 changes from (D) in FIG. 10 to (E) in FIG. 10.

In S706, the counter upon previous exchanging is overwritten to the present obtained counter value ((B) in FIG. 10) from the data stored in the monitoring apparatus 1, thereby completing the parts counter information.

In S707, the data to which the data complementing operation has been performed by the foregoing means for every part is converted into the data in a predetermined data format adapted to notify the center side management server, and such is notified to the center side management server by using proper communicating means.

By the processes shown in FIG. 7 and described above, it is possible to discriminate whether or not the image forming apparatus as a target (S701) whose counter is obtained by the obtaining means has the function for notifying the outside of the use results of the parts before the exchanging (S702). The use history of the part before the exchanging can be determined in S704 and S705 on the basis of the discrimination result and the counter value obtained by the obtaining means. Thus, with respect to a network print environment, as a target, in which the image forming apparatus which cannot accurately notify the external apparatus and the image forming apparatus having the function which can notify the external apparatus of the accurate use results in the parts before the exchanging exist together, the life reference of each part of the image forming apparatus can be more accurately managed in accordance with the use results of each image forming apparatus. When the serviceman or the like exchanges the parts, an annoying operation concerning the life counter of each part provided for the image forming apparatus can also be reduced.

The counter upon previous exchanging of the parts counter of the device to be managed can be notified to the center side management server irrespective of the presence or absence of the function for holding the parts exchange history. That is, since the center side management server can uniformly manage them without considering performance of the device to be managed, in the center side management server, a burden such as addition of the process or the like depending on the type of device is eliminated and the counter value upon previous exchanging is guaranteed. Therefore, the counter value upon previous exchanging can be effectively used.

Second Embodiment

Although the foregoing first embodiment has been described on the assumption that the complementing process in FIG. 7 is executed by the monitoring apparatus 1, the invention is not limited to such an example, but a part or all of the processes in step S702 and subsequent steps in FIG. 7 can also be executed by the center side management server 6 or the PC 7. In other words, the invention can be applied to a form in which the processes in step S702 and subsequent steps are executed by an information processing apparatus which can obtain the use histories of the parts in the image forming apparatus.

In such a case, the process in S701 in FIG. 7 can be replaced with the process for notifying the center side management server 6 of the counter data of each of a plurality of parts obtained from each device. Although the difference from the first embodiment has been described in particular here, since other constructions in the second embodiment are similar to those described in the first embodiment, their detailed description is omitted here.

In addition, as can be appreciated by those of ordinary skill in the art, the present invention may be implemented by either a single device or by a system comprising a plurality of devices.

It should be noted that a software program for implementing the capabilities of the above-described embodiments, supplied either directly from a recording medium or by using wire or wireless communications, to a system or apparatus having a computer capable of executing such program, the execution of such program by the computer of the system or apparatus achieving equivalent capabilities of the above described embodiments, is included in the present invention.

Accordingly, a program supplied to and installed in such a computer for the purpose of implementing the functional processes of the present invention itself achieves the present invention. That is, a computer program for implementing the processes performed by the present invention is itself included within the present invention.

In such a case, provided the program capabilities are present, the format of the program, whether executed by object code or by an interpreter, for example, does not matter.

The recording media for supplying the program include, but are not limited to, magnetic recording media such as a floppy disk, a hard disk or magnetic tape, optical or magneto-optical recording media such as MO, CD-ROM, CD-R, CD-RW, DVD-ROM, DVD-R, or DVD-RW, or a non-volatile semiconductor memory.

Wire and wireless methods of supplying the program to the system or apparatus described above include, but are not limited to, a computer program that forms the present invention on a server on the computer network, or storing a data file (that is, a program data file) that can become a computer program that forms the present invention on a client computer, such as a compressed file with a self-installing capability, and downloading the program data file to a connected client computer. In this case, the program data file can be divided into a plurality of segment files and the segment files disposed at different servers.

In other words, a server device that downloads to a plurality of users a program data file for implementing the function processes of the present invention by computer is also included within the present invention.

As can be appreciated by those with ordinary skill in the art, the program of the present invention may be encrypted and stored on a recording medium such as a CD-ROM and distributed to users, with decryption data for decrypting the encryption being made available to users who fulfill certain conditions, for example, by downloading from a homepage via the Internet, the users then using the decryption data to execute the encrypted program for installation on a computer.

In addition, as can be appreciated by those with ordinary skill in the art, in addition to implementing the capabilities of the above-described embodiments by reading out and executing the above-described program by computer, the above-described capabilities of the embodiments described above can also be implemented by Operating System (OS) software running on a computer and performing some or all of the actual processes described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

The present invention detects deterioration in picture quality due to the presence of defective toner and can prevent the formation of poor-quality images.

The present invention is not limited to the above embodiments, and various changes and modifications can be made within the spirit and scope of the present invention. Therefore, to apprise the public of the scope of the present invention, the following claims are made.

As described above, according to the invention, in the information processing apparatus which can obtain the use histories of the parts in the image forming apparatus, the count values of the parts in the image forming apparatus are obtained, it is possible to realize the mechanism in which the magnitudes of the obtained counter values are discriminated, and if it is determined by the discrimination that the counter value becomes smaller, with respect to the parts before the exchanging as targets, the counter value obtained the last is set to the user results of the parts before the exchanging.

What is claimed is:

1. An information processing apparatus which can communicate with an image forming apparatus through a communication line, comprising:

an obtaining unit adapted to obtain a counter value of a part in the image forming apparatus;

a discriminating unit adapted to discriminate whether the counter value currently obtained by said obtaining unit is less than a previously obtained counter value; and a complementing unit adapted to complement use results of the part before exchanging if determined by said discriminating unit that the currently obtained counter value is less than the previously obtained counter value, wherein said discriminating unit discriminates that the counter value has been reset if determined by said discriminating unit that the currently obtained counter value is less than the previously obtained counter value.

2. An apparatus according to claim 1, wherein said complementing unit sets the counter value obtained last with respect to the part before the exchanging as a target into the use results of the part before the exchanging.

3. An apparatus according to claim 1, further comprising:

a judging unit adapted to judge whether or not the image forming apparatus as a target whose counter is obtained by said obtaining unit has a function of notifying an outside of the use results of the part before the exchanging;

a determining unit adapted to determine the use results of the part before the exchanging on the basis of a judgment result by said judging unit and the counter value obtained by said obtaining unit; and a managing unit adapted to mange the use results of the part before the exchanging determined by said determining unit.

4. An apparatus according to claim 1, wherein when no valid value exists in a field of a counter upon previous exchanging, said complementing unit sets the counter value obtained the last with respect to the part before the exchanging as a target into the use results of the part before the exchanging.

5. An apparatus according to claim 1, wherein said obtaining unit obtains a counter value of each of a plurality of kinds of parts in the image forming apparatus.

6. An apparatus according to claim 1, further comprising a notifying unit adapted to notify an external apparatus of information including the number of parts, identifiers of the parts, and the use results regarding each part, and wherein the use results regarding each part are complemented by said complementing unit.

7. An apparatus according to claim 1, wherein the complementation by said complementing unit is a process for predicting the rough use results of some parts.

8. A maintenance managing method in an information processing apparatus which can obtain use results of parts in an image forming apparatus, comprising:

an obtaining step of obtaining a counter value of a part in the image forming apparatus;

a discriminating step of discriminating whether the counter value currently obtained in said obtaining step is less than a previously obtained counter value; and a complementing step of complementing use results of the part before exchanging if determined in said discriminating step that the currently obtained counter value is less than the previously obtained counter value, wherein said discriminating step discriminates that the counter value has been reset if determined in said discriminating step that the currently obtained counter value is less than the previously obtained counter value.

9. A method according to claim 8, wherein in said complementing step, the counter value obtained last with respect to the part before the exchanging as a target is set into the use results of the part before the exchanging.

10. A method according to claim 8, wherein in said complementing step, when no valid value exists in a field of a counter upon previous exchanging, the counter value obtained the last with respect to the part before the exchanging as a target is set into the use results of the part before the exchanging.

11. A method according to claim 8, wherein said obtaining step includes a plurality of steps of obtaining counter values of a plurality of kinds of parts in the image forming apparatus, respectively.

12. A method according to claim 8, further comprising a notifying step of notifying an external apparatus of information including the number of parts, identifiers of the parts, and the use results regarding each part, and wherein the use results regarding each part are complemented in said complementing step.

13. A method according to claim 8, wherein the complementation in said complementing step is a process for predicting the rough use results of some parts.

14. A program for allowing a computer to execute a maintenance managing method in an information processing apparatus which can obtain use results of parts in an image forming apparatus, comprising:

an obtaining step of obtaining a counter value of a part in the image forming apparatus;

a discriminating step of discriminating whether the counter value currently obtained in said obtaining step is less than a previously obtained counter value; and a complementing step of complementing use results of the part before exchanging if determined in said discriminating step that the currently obtained counter value is less than the previously obtained counter value, wherein said discriminating step discriminates that the counter value has been reset if determined in said discriminating step that the currently obtained counter value is less than the previously obtained counter value.

15. A program according to claim 14, wherein in said complementing step, when no valid value exists in a field of a counter upon previous exchanging, the counter value obtained last with respect to the part before the exchanging as a target is set into the use results of the part before the exchanging.

16. A program according to claim 14, wherein said obtaining step includes a plurality of steps of obtaining the counter values of a plurality of kinds of parts in the image forming apparatus, respectively.

17. A program according to claim 16, further comprising a notifying step of notifying an external apparatus of information including the number of parts, identifiers of the parts, and the use results regarding each part, and wherein the use results regarding each part are complemented in said complementing step.

18. A program according to claim 14, wherein the complementation in said complementing step is a process for predicting the rough use results of some parts.

19. A method according to claim 8, further comprising:

a judging step of judging whether or not the image forming apparatus as a target whose counter is obtained in said obtaining step has a function of notifying an outside of the use results of the part before the exchanging;

a determining step of determining the use results of the part before the exchanging on the basis of a judgment result in said judging step and the counter value obtained in said obtaining step; and a managing step of managing the use results of the part before the exchanging determined in said determining step.

20. A program according to claim 14, wherein in said complementing step, the counter value obtained the last with respect to the part before the exchanging as a target is set into the use results of the part before the exchanging.

21. A program according to claim 14, further comprising:

a judging step of judging whether or not the image forming apparatus as a target whose counter is obtained in said obtaining step has a function of notifying an outside of the use results of the part before the exchanging;

a determining step of determining the use results of the part before the exchanging on the basis of a judgment result in said judging step and the counter value obtained in said obtaining step; and a managing step of managing the use results of the part before the exchanging determined in said determining step.

* * * * *